United States Patent
Lee

(10) Patent No.: US 12,382,364 B2
(45) Date of Patent: Aug. 5, 2025

(54) METHOD AND APPARATUS FOR CONGESTION CONTROL IN WIRELESS COMMUNICATION SYSTEM

(71) Applicant: LG ELECTRONICS INC., Seoul (KR)

(72) Inventor: Ki-Dong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 499 days.

(21) Appl. No.: 17/913,111

(22) PCT Filed: Mar. 29, 2021

(86) PCT No.: PCT/KR2021/003858
§ 371 (c)(1),
(2) Date: Sep. 20, 2022

(87) PCT Pub. No.: WO2021/201534
PCT Pub. Date: Oct. 7, 2021

(65) Prior Publication Data
US 2023/0123445 A1    Apr. 20, 2023

Related U.S. Application Data

(60) Provisional application No. 63/002,321, filed on Mar. 30, 2020.

(51) Int. Cl.
*H04W 40/18*    (2009.01)
(52) U.S. Cl.
CPC .................................. *H04W 40/18* (2013.01)

(58) Field of Classification Search
CPC . H04W 40/18; H04W 28/0289; H04W 40/20; H04W 88/04; H04W 4/90; H04W 40/22
See application file for complete search history.

(56) References Cited

U.S. PATENT DOCUMENTS

| | | | |
|---|---|---|---|
| 10,856,118 B2 * | 12/2020 | Lee | ........................ H04W 4/80 |
| 10,972,893 B1 * | 4/2021 | Vangala | .................. H04W 4/46 |
| 2018/0222388 A1 | 8/2018 | Shenoy et al. | |
| 2018/0227718 A1 | 8/2018 | Lu et al. | |
| 2018/0255595 A1 | 9/2018 | Seo | |

(Continued)

FOREIGN PATENT DOCUMENTS

WO    2019043446    3/2019

OTHER PUBLICATIONS

PCT International Application No. PCT/KR2021/003858, International Search Report dated Jul. 5, 2021, 3 pages.

*Primary Examiner* — Hashim S Bhatti
(74) *Attorney, Agent, or Firm* — LEE, HONG, DEGERMAN, KANG & WAIMEY

(57) ABSTRACT

The present disclosure relates to a congestion control in wireless communications. According to an embodiment of the present disclosure, a method performed by a wireless device in a wireless communication system comprises: obtaining density information of neighboring wireless devices with respect to a reference wireless device; receiving a block from a neighboring wireless device; determining a probability that the wireless device will relay the received block based on the density information; and determining whether to relay the received block based on the probability.

15 Claims, 15 Drawing Sheets

(56) References Cited

U.S. PATENT DOCUMENTS

2019/0364402 A1* 11/2019 Lee .................... H04W 4/40
2019/0364501 A1   11/2019 Kwon et al.
2020/0084708 A1    3/2020 Ingale et al.
2020/0134936 A1*  4/2020 Kawaguchi ............ G07C 5/12

* cited by examiner

METHOD AND APPARATUS FOR CONGESTION CONTROL IN WIRELESS COMMUNICATION SYSTEM

CROSS-REFERENCE TO RELATED APPLICATIONS

This application is the National Stage filing under 35 U.S.C. 371 of International Application No. PCT/KR2021/003858, filed on Mar. 29, 2021, which claims the benefit of U.S. Provisional Application No. 63/002,321, filed on Mar. 30, 2020, the contents of which are all incorporated by reference herein in their entirety.

TECHNICAL FIELD

The present disclosure relates to a congestion control in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In various road situations, a vehicle may fall in emergency situation. Instead of the emergency vehicle to make a call, the emergency vehicle may disseminate emergency-related information to neighboring vehicles. The neighboring vehicles can forward the received emergency related information to a network. However, as many neighboring vehicles perform this forwarding behavior, traffic congestion may happen.

SUMMARY

1. Technical Problem

An aspect of the present disclosure is to provide method and apparatus for congestion control in a wireless communication system.

Another aspect of the present disclosure is to provide method and apparatus for relaying emergency-related information to a network in a wireless communication system.

2. Technical Solution

According to an embodiment of the present disclosure, a method performed by a wireless device in a wireless communication system comprises: obtaining density information of neighboring wireless devices with respect to a reference wireless device; receiving a block from a neighboring wireless device; determining a probability that the wireless device will relay the received block based on the density information; and determining whether to relay the received block based on the probability.

According to an embodiment of the present disclosure, a wireless device in a wireless communication system comprises: a transceiver; a memory; and at least one processor operatively coupled with the transceiver and the memory, and configured to: obtain density information of neighboring wireless devices with respect to a reference wireless device; control the transceiver to receive a block; determine a probability that the wireless device will relay the received block based on the density information; and determine whether to relay the received block based on the probability.

According to an embodiment of the present disclosure, a processor for a wireless device in a wireless communication system is configured to control the wireless device to perform operations comprising: obtaining density information of neighboring wireless devices with respect to a reference wireless device; receiving a block; determining a probability that the wireless device will relay the received block based on the density information; and determining whether to relay the received block based on the probability.

According to an embodiment of the present disclosure, a computer-readable medium having recorded thereon a program for performing each step of a method on a computer is provided. The method comprises: obtaining density information of neighboring wireless devices with respect to a reference wireless device; receiving a block; determining a probability that the wireless device will relay the received block based on the density information; and determining whether to relay the received block based on the probability.

According to an embodiment of the present disclosure, a method performed by a base station (BS) in a wireless communication system comprises: receiving, from an access and mobility management function (AMF), density information of neighboring wireless devices with respect to a reference wireless device; preparing a system information block (SIB) including the density information; and transmitting the SIB to a plurality of wireless devices including a wireless device, wherein the density information is used to determine a probability that the wireless device will relay a block received by the wireless device.

According to an embodiment of the present disclosure, a base station (BS) in a wireless communication system comprises: a transceiver; a memory; and at least one processor operatively coupled to the transceiver and the memory, and configured to: control the transceiver to receive, from an access and mobility management function (AMF), density information of neighboring wireless devices with respect to a reference wireless device; prepare a system information block (SIB) including the density information; and control the transceiver to transmit the SIB to a plurality of wireless devices including a wireless device, wherein the density information is used to determine a probability that the wireless device will relay a block received by the wireless device.

3. Advantageous Effect

The present disclosure may have various advantageous effects.

For example, a UE may selectively relay the emergency-related information to a network based on density information of neighboring vehicles around the emergency vehicle so that a load on communication channel and traffic congestion can be relieved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
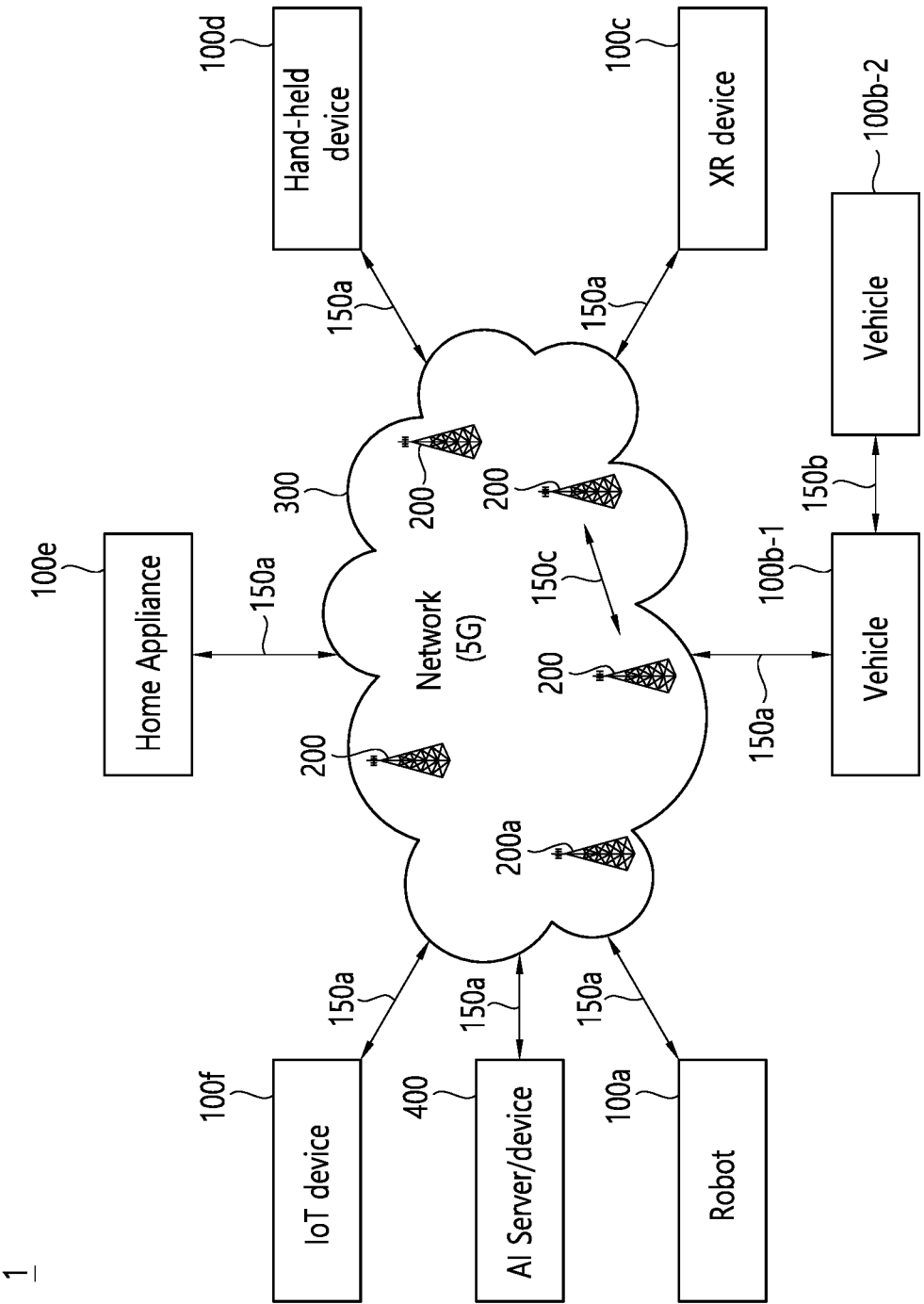
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information?

Technical features that are separately described in one drawing in the present disclosure may be implemented separately or simultaneously.

The terms used throughout the disclosure can be defined as the followings:

"Automatic emergency braking (AES)" is a system that can detect an impending forward crash with another vehicle in time to avoid or mitigate the crash.

"Advanced emergency braking system (AEBS)" is a system which can automatically detect a potential forward collision and activate a vehicle braking system to decelerate the vehicle with the purpose of avoiding or mitigating a collision.

"Collision avoidance system (CAS)", also known as a precrash system (PCS), forward collision warning system, and/or collision mitigation system, is an automobile safety system designed to prevent or reduce the severity of a collision.

"More civilized driving environment" is a driving environment involved with more developed setting, for example, 3-dimension (3D) road configuration (e.g., near intersection of free ways with multiple different path ways occupying different altitudes), a certain length of freeway segment containing complex branches involved (e.g., complex ramps, entrance/exist which emergency responder vehicle must obtain very detailed vector/point to go through or reach), and/or automated driving vehicle. This term is intended to describe more developed environments, as given as examples, such that more detailed design and development of wireless communication technology are expected to properly serve more developed environments for driving.

"Automatic crash notification (ACN)" is a safety technology designed to notify emergency responders that a crash has occurred and provide a location of the crash.

"Advanced automatic crash notification (AACN)" is a successor to the ACN system. The AACN may capture crash data from vehicle collisions and send the information to emergency responders, alerting responders of the location and nature of the crash so they can respond more quickly with the appropriate equipment. Crash and collision are oftentimes used interchangeably.

"eCall (emergency call designed for vehicle accident use cases)" is a manually or automatically initiated emergency call from a vehicle, supplemented with a minimum set of emergency related data (MSD).

"Automatically initiated eCall (AIeC)" is an eCall that is automatically initiated.

"Manually initiated eCall" is an eCall that is manually initiated.

"Next generation (NG)-eCall" is a manually or automatically initiated Internet protocol (IP) multimedia subsystem (IMS) emergency call, from a vehicle, supplemented with an MSD.

"Minimum set of data (MSD)" forms the data component of an eCall sent from a vehicle to a Public Safety Answering Point (PSAP) or other designated emergency call center. The MSD has a maximum size of 140 bytes and includes, for example, vehicle identity, location information and/or timestamp.

"enhanced MSD (eMSD)" can include vertical location coordinates (relative or absolute), can be represented in the form of blockchain (who made what info, when, where, and based on what kind of previous information (previous block)), and so on.

"MSD data frame" is an uplink signal transmission interval containing data of one MSD (after synchronization has been established). The MSD data frame may correspond to a time interval of 1320 ms, 10560 samples (fast modulator), 2320 ms or 18560 samples (robust modulator) assuming an 8 kHz sampling rate.

"Public safety answering point (PSAP)" is a physical location where eCalls from the public are received.

"Pre-crash system (PCS) sensing function (PCSSF)" is a function that implements the CAS and/or the PCS.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
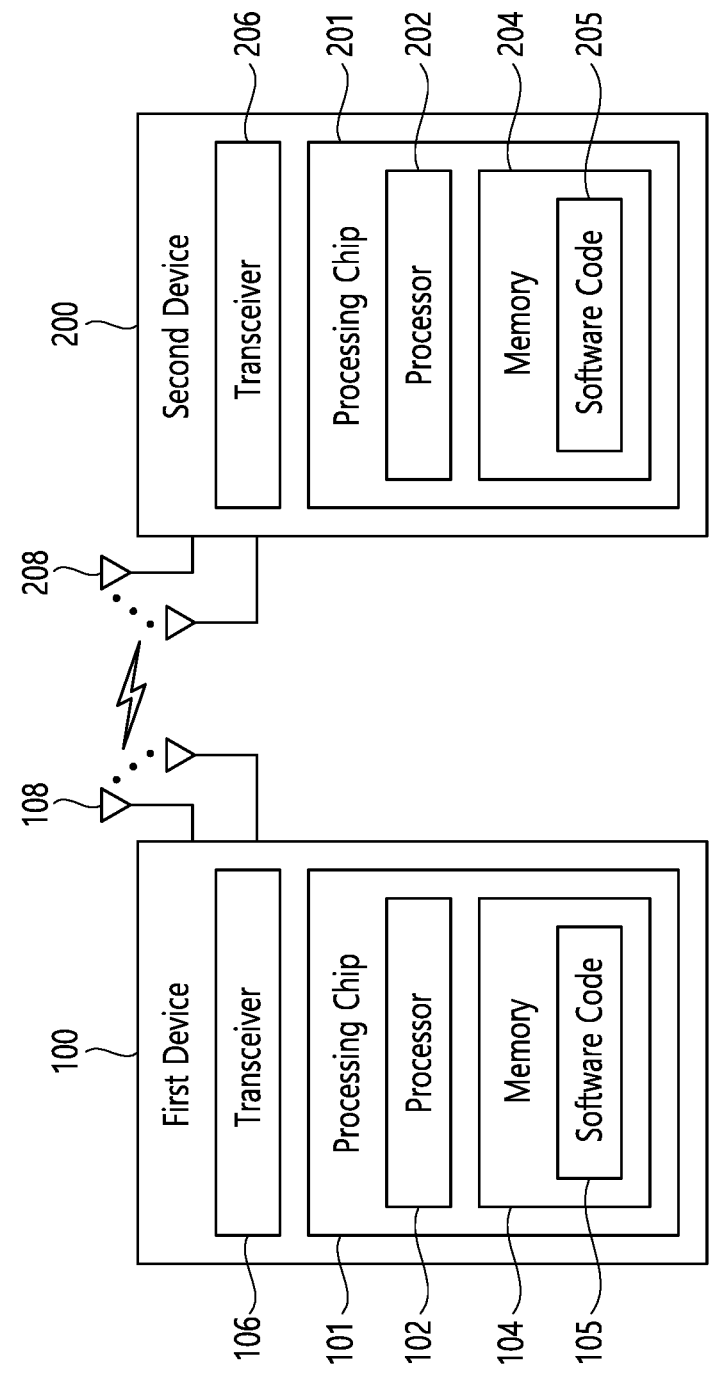
FIG. 2 shows an example of wireless devices to which implementations of the present disclosure is applied.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names. FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNodeB (eNB), or a gNB.

Figure 3:
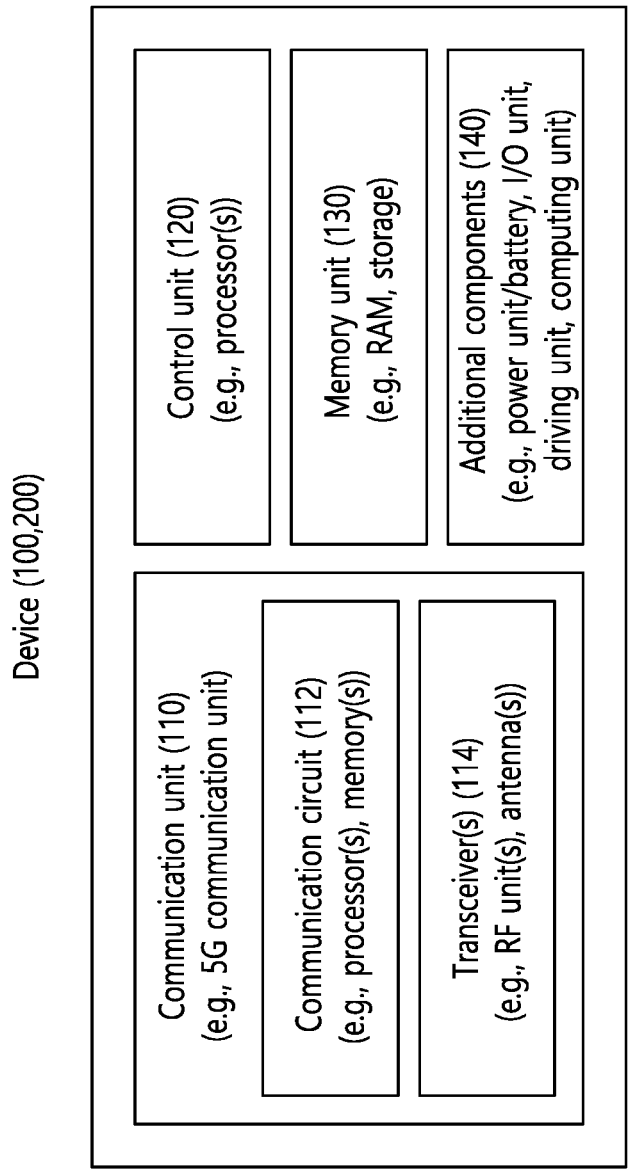
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
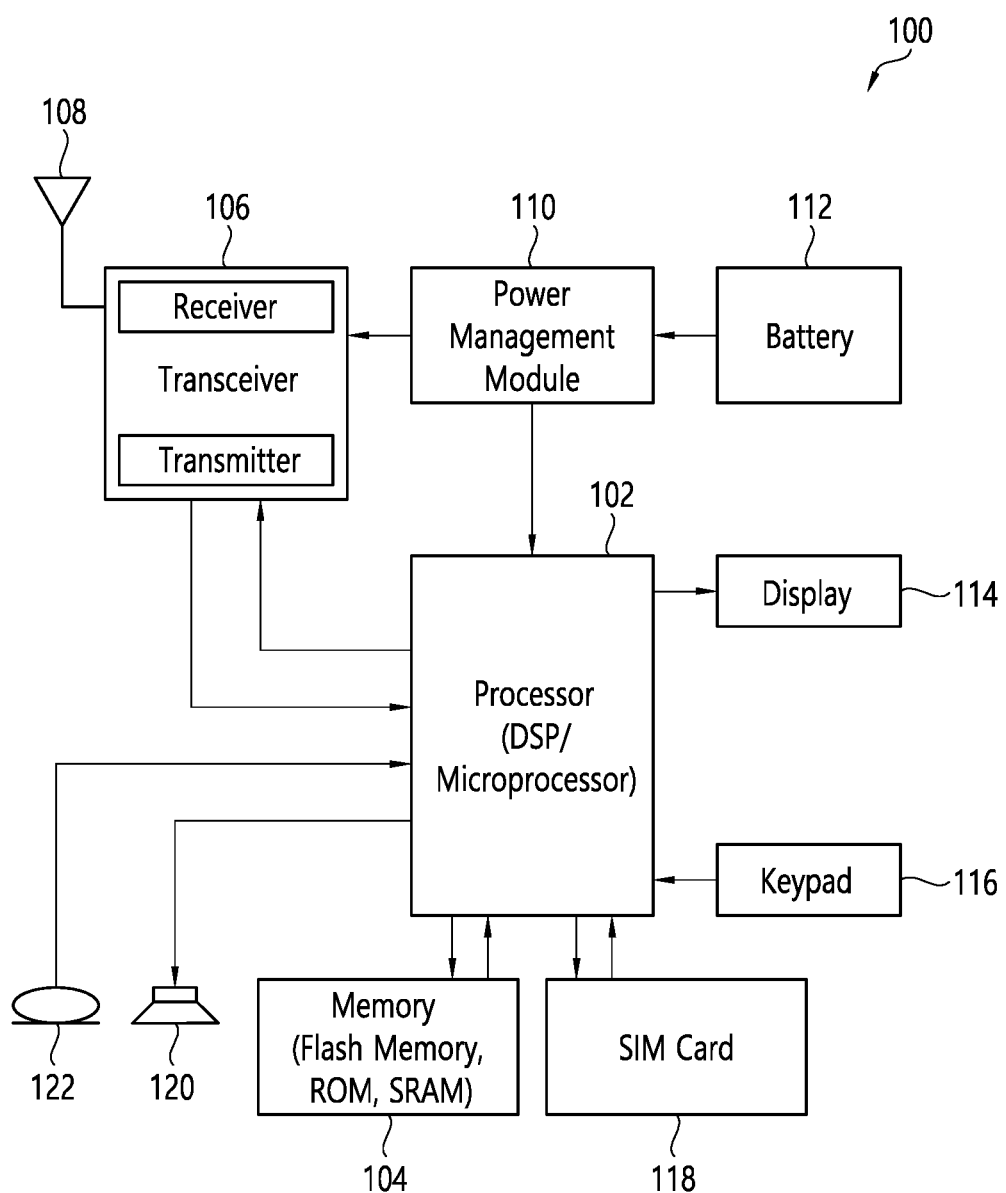
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
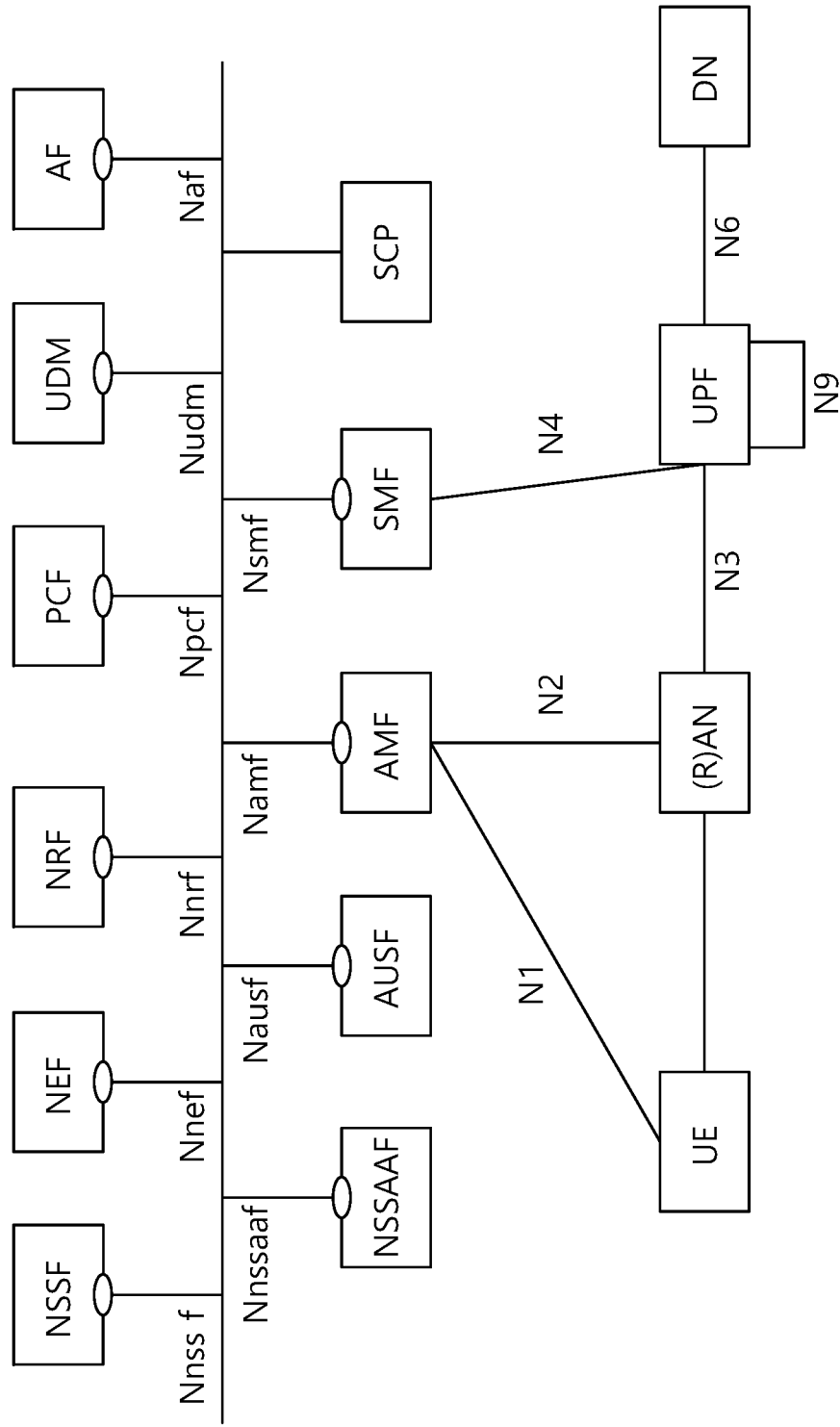
FIG. 5 shows an example of a system architecture for a communication system to which technical features of the present disclosure can be applied.

FIG. 5 shows an example of a system architecture for a communication system to which technical features of the present disclosure can be applied. An example of the communication system may comprise a 5G system and/or NR system.

Referring to FIG. 5, the communication system may comprise various core network entities, such as an access and mobility management function (AMF), a session management function (SMF), a user plane function (UPF), a policy control function (PCF), an authentication server function (AUSF), a unified data management (UDM), an application function (AF), a network exposure function (NEF), a network function repository function (NRF), a network slice selection function (NSSF), a network slice specific authentication and authorization function (NS-SAAF) and a service communication proxy (SCP).

The AMF may support a termination of non-access stratum (NAS) signalling, NAS ciphering & integrity protection, registration management, connection management, mobility management, access authentication and authorization, security context management. The AMF may be associated with N1, N2 and Namf. The N1 is a reference point between the UE and the AMF. The N2 is a reference point between the RAN and the AMF. The Namf is a service-based interface exhibited by the AMF.

The SMF may support a session management (session establishment, modification, release), UE internet protocol (IP) address allocation & management, dynamic host configuration protocol (DHCP) functions, termination of NAS signalling related to session management, DL data notification, traffic steering configuration for UPF for proper traffic routing. The SMF may be associated with N4 and Nsmf. The N4 is a reference point between the SMF and the UPF. The Nsmf is a service-based interface exhibited by the SMF.

The UPF may support packet routing & forwarding, packet inspection, quality of service (QoS) handling, acts as external protocol data unit (PDU) session point of interconnect to Data Network (DN), and may be an anchor point for intra- & inter-radio access technology (RAT) mobility. The UPF may be associated with N3, N4, N6 and N9. The N3 is a reference point between the RAN and the UPF. The N6 is a reference point between the UPF and the DN. The N9 is a reference point between two UPFs.

The PCF may support unified policy framework, providing policy rules to control plane (CP) functions, access subscription information for policy decisions in a unified data repository (UDR). The PCF may be associated with Npcf. The Npcf is a service-based interface exhibited by the PCF.

The AUSF may act as an authentication server. The AUSF may be associated with Nausf. The Nausf is a service-based interface exhibited by the AUSF.

The UDM may support generation of Authentication and Key Agreement (AKA) credentials, user identification handling, access authorization, subscription management. The UDM may be associated with Nudm. The Nudm is a service-based interface exhibited by the UDM.

The AF may support application influence on traffic routing, accessing NEF, interaction with policy framework for policy control. The AF may be associated with Naf. The Naf is a service-based interface exhibited by the AF.

The NEF may support exposure of capabilities and events, secure provision of information from external application to 3GPP network, translation of internal/external information. The NEF may be associated with Nnef. The Nnef is a service-based interface exhibited by the NEF.

The NRF may support service discovery function, maintains NF profile and available NF instances. The NRF may be associated with Nnrf. The Nnrf is a service-based interface exhibited by the NRF.

The NSSF may support selecting of the Network Slice instances to serve the UE, determining the allowed network slice selection assistance information (NSSAI), determining the AMF set to be used to serve the UE. The NSSF may be associated with Nnssf. The Nnssf is a service-based interface exhibited by the NSSF.

The NSSAAF may support Network Slice-Specific Authentication and Authorization with a AAA Server (AAA-S). If the AAA-S belongs to a third party, the NSSAAF may contact the AAA-S via an AAA proxy (AAA-P). The NSSAAF may be associated with Nnssaaf. The Nnssaaf is a service-based interface exhibited by the NSSAAF.

The SCP may support indirect communication, delegated discovery, message forwarding and routing to destination network function (NF)/NF service, Message forwarding and routing to a next hop SCP, communication security (e.g. authorization of the NF Service Consumer to access the NF Service Producer API), load balancing, monitoring, overload control, optionally interact with UDR, to resolve the UDM Group ID/UDR Group ID/AUSF Group ID/PCF Group ID/charging function (CHF) Group ID/home subscriber server (HSS) Group ID based on UE identity (e.g., subscription permanent identifier (SUPI) or international mobility subscriber identity (IMPI)/IP multimedia public identity (IMPU)).

Figure 6:
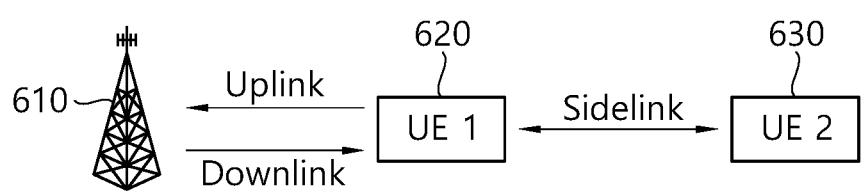
FIG. 6 shows an example of communication links to which technical features of the present disclosure can be applied.

FIG. 6 shows an example of communication links to which technical features of the present disclosure can be applied.

Referring to FIG. 6, the communication links comprise uplink, downlink, and sidelink. The uplink is a communication interface from a UE (e.g., UE 620) to a base station (e.g., base station 610, such as eNB and/or gNB). The downlink is a communication interface from a base station (e.g., base station 610) to a UE (e.g., UE 620).

The sidelink is UE to UE interface for sidelink communication, sidelink discovery and/or V2X (vehicle to everything) communication. For example, the sidelink may correspond to a PC5 interface for sidelink communication, sidelink discovery and/or V2X sidelink communication.

A UE may perform a communication via network infrastructure. For example, as shown in FIG. 6, the UE1 620 may perform an uplink transmission and/or receive a downlink transmission, via the base station 610.

Also, a UE may perform a communication directly with a peer UE without using the network infrastructure. For example, as shown in FIG. 6, the UE1 620 may perform a direct communication with the UE2 630 via sidelink, without a support of the network infrastructure such as base station 610.

According to various embodiments, upper layers configure the UE to receive or transmit sidelink communication on a specific frequency, to monitor or transmit non-public safety (PS) related sidelink discovery announcements on one or more frequencies or to monitor or transmit PS related sidelink discovery announcements on a specific frequency, but only if the UE is authorized to perform these particular proximity service (ProSe) related sidelink activities.

Sidelink communication comprises one-to-many and one-to-one sidelink communication. One-to-many sidelink communication comprises relay related and non-relay related one-to-many sidelink communication. One-to-one sidelink communication comprises relay related and non-relay related one-to-one sidelink communication. In relay related one-to-one sidelink communication the communicating parties comprise one sidelink relay UE and one sidelink remote UE.

Sidelink discovery comprises public safety related (PS related) and non-PS related sidelink discovery. PS related sidelink discovery comprises relay related and non-relay related PS related sidelink discovery. Upper layers indicate to RRC whether a particular sidelink announcement is PS related or non-PS related.

According to various embodiments, upper layers indicate to radio resource control (RRC) whether a particular sidelink procedure is V2X related or not.

According to various embodiments, the UE shall perform V2X sidelink communication operation if at least one of the following conditions 1)~3) is met:

Condition 1) if the UE's serving cell is suitable (RRC_IDLE or RRC_CONNECTED); and if either the selected cell on the frequency used for V2X sidelink communication operation belongs to the registered or equivalent public land mobile network (PLMN) as specified in 3GPP TS 24.334 or the UE is out of coverage on the frequency used for V2X sidelink communication operation as defined in 3GPP TS36.304;

Condition 2) if the UE's serving cell (for RRC_IDLE or RRC_CONNECTED) fulfils the conditions to support V2X sidelink communication in limited service state as specified in 3GPP TS 23.285; and if either the serving cell is on the frequency used for V2X sidelink communication operation or the UE is out of coverage on the frequency used for V2X sidelink communication operation as defined in 3GPP TS 36.304; or Condition 3) if the UE has no serving cell (RRC_IDLE).

Figure 7:
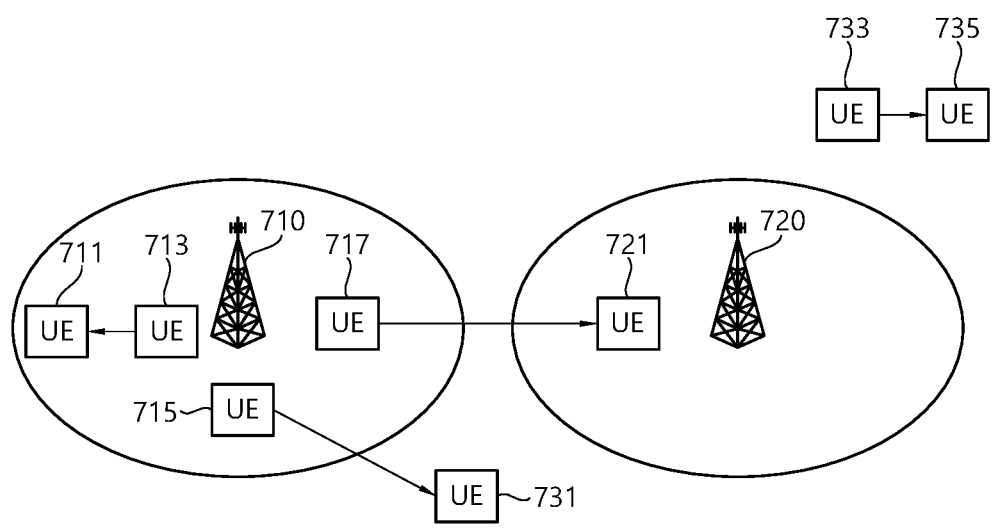
FIG. 7 shows an example of sidelink connectivity types to which technical features of the present disclosure can be applied.

FIG. 7 shows an example of sidelink connectivity types to which technical features of the present disclosure can be applied.

Referring to FIG. 7, a sidelink connectivity between UE 711 and UE 713 may be "in-coverage", where the two UEs UE 711 and UE 713 are under a coverage of a network (e.g., base station 710). Also, the sidelink connectivity between the UE 711 and the UE 713 may be in-coverage of intra-cell type, as the UE 711 receiving a sidelink transmission is within a same cell as the UE 713 transmitting the sidelink transmission.

A sidelink connectivity between UE 717 and UE 721 may be also in-coverage, as the two UEs 717 and 721 are under a coverage of a network. However, unlike the case of the UE 711 and the UE 713, the sidelink connectivity between the UE 717 and the UE 721 may be in-coverage of inter-cell type, as the UE 721 receiving a sidelink transmission is within a cell coverage of a base station 720 while the UE 717 transmitting the sidelink transmission is within a cell coverage of a base station 710.

A sidelink connectivity between UE 715 and UE 731 may be "partial-coverage", where one of the two UEs (e.g., UE 715) is under a coverage of a network while the other UE (e.g., UE 731) is outside the coverage of the network.

A sidelink connectivity between UE 733 and UE 735 may be "out-of-coverage", where the two UEs UE 733 and UE 735 are outside a coverage of a network.

Figure 8:
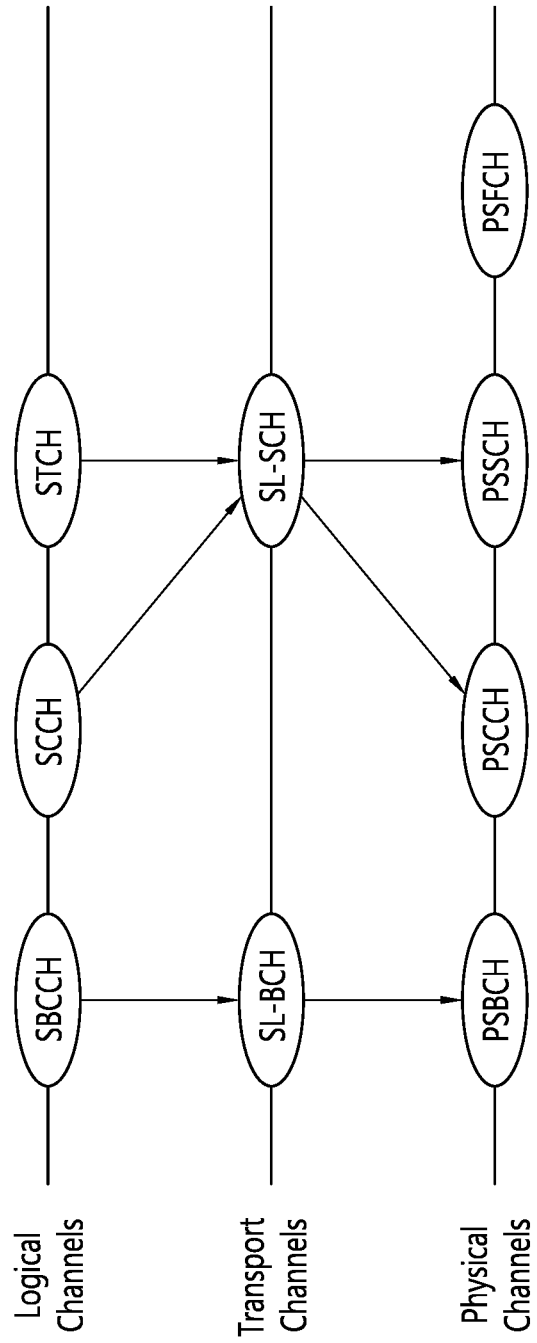
FIG. 8 shows an example of sidelink channel mapping to which technical features of the present disclosure can be applied.

FIG. 8 shows an example of sidelink channel mapping to which technical features of the present disclosure can be applied.

Referring to FIG. 8, sidelink logical channels may comprise sidelink traffic channel (STCH), sidelink control channel (SCCH) and sidelink broadcast control channel (SBCCH). Sidelink transport channels may comprise sidelink shared channel (SL-SCH) and sidelink broadcast channel (SL-BCH). Sidelink physical channels may comprise a physical sidelink shared channel (PSSCH), a physical sidelink control channel (PSCCH), a physical sidelink feedback channel (PSFCH) and physical sidelink broadcast channel (PSBCH).

The SCCH is a sidelink channel for transmitting control information (i.e., PC5-RRC and PC5-S messages) from one UE to one or more other UEs. The SCCH can be mapped to SL-SCH which, in turn, mapped to the PSCCH.

The STCH is a sidelink channel for transmitting user information from one UE to one or more other UEs. The STCH can be mapped to SL-SCH which, in turn, is mapped to the PSSCH.

The SBCCH is a sidelink channel for broadcasting sidelink system information from one UE to other UE(s). The SBCCH can be mapped to SL-BCH which, in turn, mapped to the PSBCH. These channels are also used for sidelink synchronization, and comprise sidelink related system information. For example, the sidelink related system information may be referred to as sidelink master information block (SL-MIB).

The PSCCH carries sidelink control information (SCI). The SCI contains sidelink scheduling information such as resource block assignment, modulation and coding scheme, and/or group destination ID.

The PSSCH carries transport blocks (TBs) of data, and control information for HARQ procedures and CSI/or CSI feedback triggers.

The PSFCH carries HARQ feedback over the sidelink from a UE which is an intended recipient of a PSSCH transmission to the UE which performed the transmission.

Meanwhile, in the event of a vehicle collision, the eCall in-band modem solution (for vehicles using the early version of eCall before IMS-based NGeCall) may be used in an automatically or manually established emergency voice call (E112) from the vehicle (IVS (or in-vehicle system which includes the NAD, eIM, collision detectors, position location (e.g. GPS) function and vehicle interface)) via the cellular network to the local emergency agencies (i.e., the PSAP). The eCall modem may allow to transfer a data message from the IVS over the cellular network to the PSAP which is denoted as eCall MSD. The MSD can include vehicle location information, time stamp, number of passengers, Vehicle Identification Number (VIN), and/or other relevant accident information. It is expected that the eCall MSD information will be sent either immediately following the establishment of the voice call or at any point later during the voice call. The integrity of the eCall data sent from the vehicle to the PSAP may be ensured by the specified modem.

AACN is an advanced version of ACN. Moreover, some new technology and candidate solutions are being developed. For example, instead of the emergency vehicle to make a call (manually or automatically), there are some new proposals as in the disclosure that the emergency vehicle should disseminate the pre-crash sensing information and other emergency-related information to neighboring vehicles, if any, and the neighboring vehicles of the emergency vehicle, if exist, can forward the received emergency-related information to PSAP. This forwarding behavior can happen in parallel with the emergency vehicle's emergency call activity.

It is considered that this forwarding behavior performed by neighboring vehicles can provide emergency-related information to PSAP more reliably and more timely in some cases, and can also provide more information (e.g., witness information) than ordinary NG-eCall or eCall when:
  the vehicle is totally damaged (not able to make wireless communication connection to PSAP); and/or
  none of driver and passenger(s), if any, cannot provide emergency-related information due to serious traumatic injury, or due to using different language (for international travelers).

The witness information may indicate not only who drove nearby but also which vehicles passed by or were around the emergency vehicle.

Further, if the aforementioned forwarding behavior, which is performed by neighboring vehicles (V-UEs or vehicle UE), is in use and in operation, there may be a case that the density of vehicles is high in the area of accident. This may mean that if there are many vehicles around the emergency vehicle, all or many of which try to forward the received emergency-related information from the emergency vehicle, the communication channel will be heavily loaded and congestion may be caused.

The present disclosure is intended to provide the efficient forwarding mechanism and to improve the problem of congestion if there are many neighboring vehicles around the emergency vehicle.

As described above, it may cause some problem associated with potential congestion that neighboring vehicle UEs (V-UEs) just relay the received emergency related information). To solve the problem, at least the following procedures may be proposed:
  Network utilizes the density information of V-UE's in a geographical area;
  eNB/gNB can broadcast/transmit the density information (e.g., using System Information Block (SIB)) to share the density information with V-UEs in a coverage area of the eNB/gNB; and/or
  Neighboring V-UEs of an emergency V-UE that have received emergency-related information does not always relay/forward the received information to PSAP but, performs a random number based checking using a threshold value (criterion) (for example, prepared as in step S1117 in FIG. 11A).

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 9:
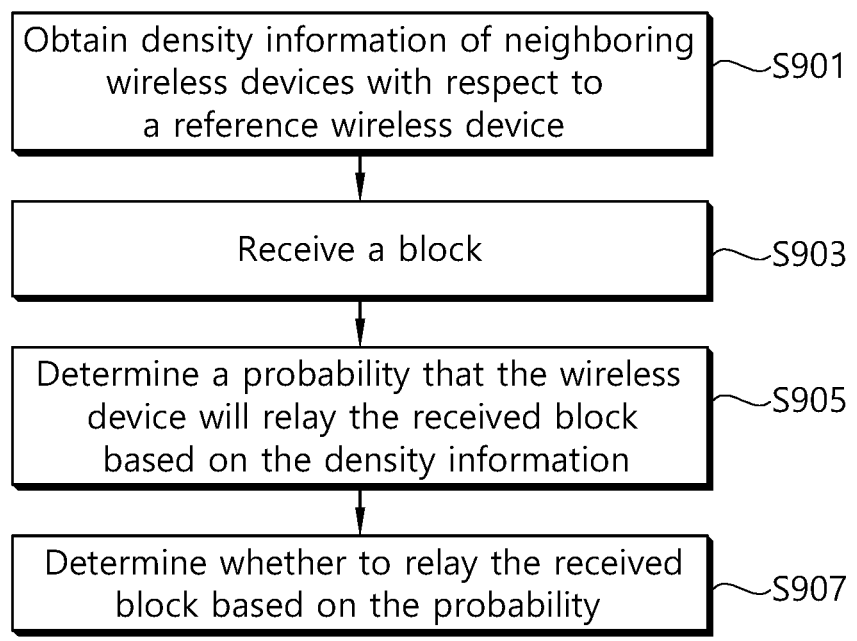
FIG. 9 shows an example of a method for determining whether to relay a block according to an embodiment of the present disclosure.

FIG. 9 shows an example of a method for determining whether to relay a block according to an embodiment of the present disclosure. Steps illustrated in FIG. 9 may be performed by a wireless device and/or a UE.

Referring to FIG. 9, in step S901, the wireless device may obtain density information of neighboring wireless devices with respect to a reference wireless device.

In step S903, the wireless device may receive a block from a neighboring wireless device.

In step S905, the wireless device may determine a probability that the wireless device will relay the received block based on the density information.

In step S907, the wireless device may determine whether to relay the received block based on the probability.

The density information may comprise at least one of the number of the neighboring wireless devices with respect to the reference wireless device, or a population density of the neighboring wireless devices in a geographical area related to the reference wireless device.

To obtain the density information, for example, the wireless device may estimate the density information. For another example, the wireless device may receive the density information from a network. The density information may be received from the network via a SIB (e.g., SIB2).

The block may comprise emergency-related information for the reference vehicle in emergency. The emergency-related information may comprise at least one of a vehicle identity of the reference vehicle, location information of the reference vehicle, or a time stamp of the emergency. The emergency-related information may be a kind of eMSD.

The probability may comprise a threshold value. The wireless device may randomly select an arbitrary value between 0 and 1 with equal probability. The wireless device may determine whether to relay the received block based on a comparison between the arbitrary value and the threshold value.

The wireless device may determine not to relay the received block based on that the arbitrary value is greater than the threshold value. The wireless device may determine to relay the received block based on that the randomly selected arbitrary value is equal to or less than the threshold value. Then, the wireless device may relay the received block to a network.

If/when the number of the neighboring wireless devices is 2 or less, the threshold value may be 1. If/when the number of the neighboring wireless devices is 3, the threshold value may be 0.67. If/when the number of the neighboring wireless devices is n which is greater than 3, the threshold value $p^*$ may be determined as $$p^* = \frac{23}{16n}.$$

Figure 10:
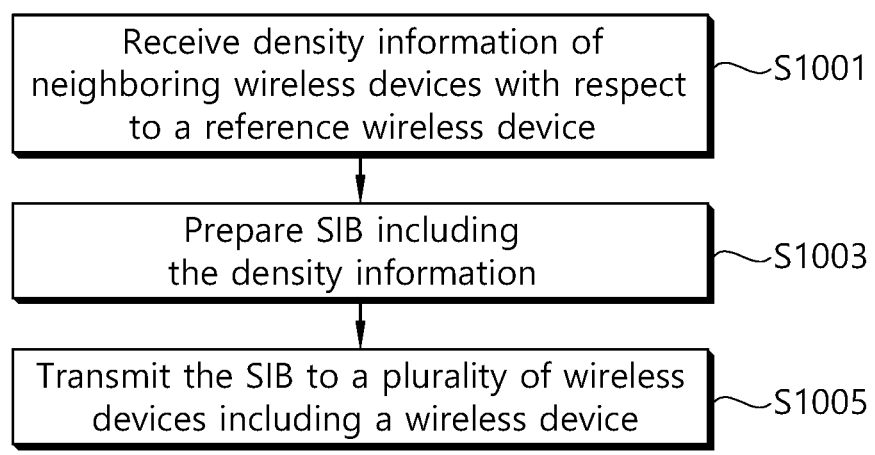
FIG. 10 shows an example of a method for providing density information to wireless devices according to an embodiment of the present disclosure.

FIG. 10 shows an example of a method for providing density information to wireless devices according to an embodiment of the present disclosure. Steps illustrated in FIG. 10 may be performed by a base station (BS).

Referring to FIG. 10, in step S1001, the BS may receive density information of neighboring wireless devices with respect a reference wireless device.

In step S1003, the BS may prepare SIB including the density information.

In step S1005, the BS may transmit the SIB to a plurality of wireless device including a wireless device. The density information may be used to determine a probability that the wireless device will relay a block received by the wireless device.

Figure 11A:
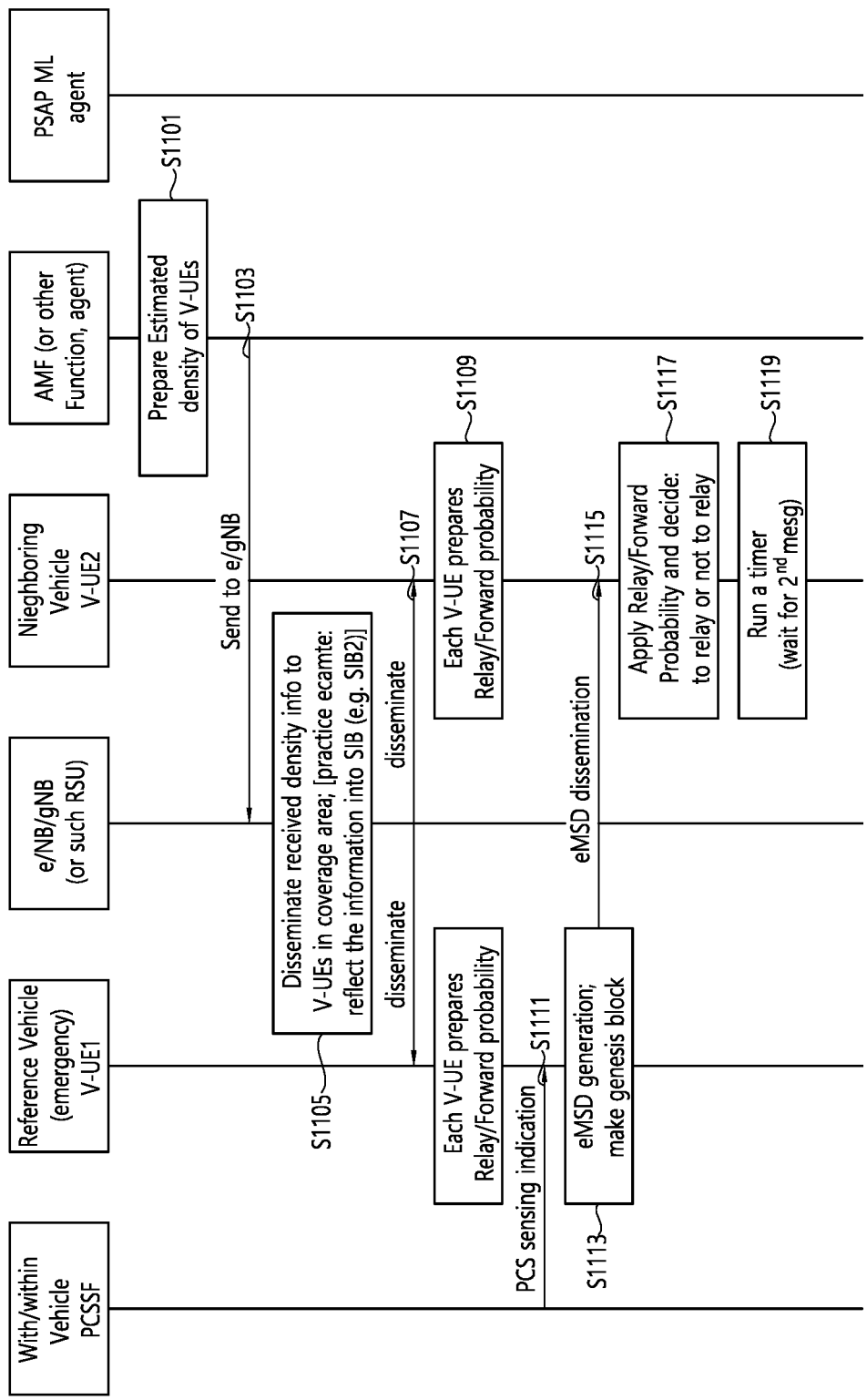
FIGS. 11A and 11B show a flow diagram of generating and relaying a behavior of blockchain between a reference V-UE and its neighboring V-UEs according to an embodiment of the present disclosure.
Figure 11B:
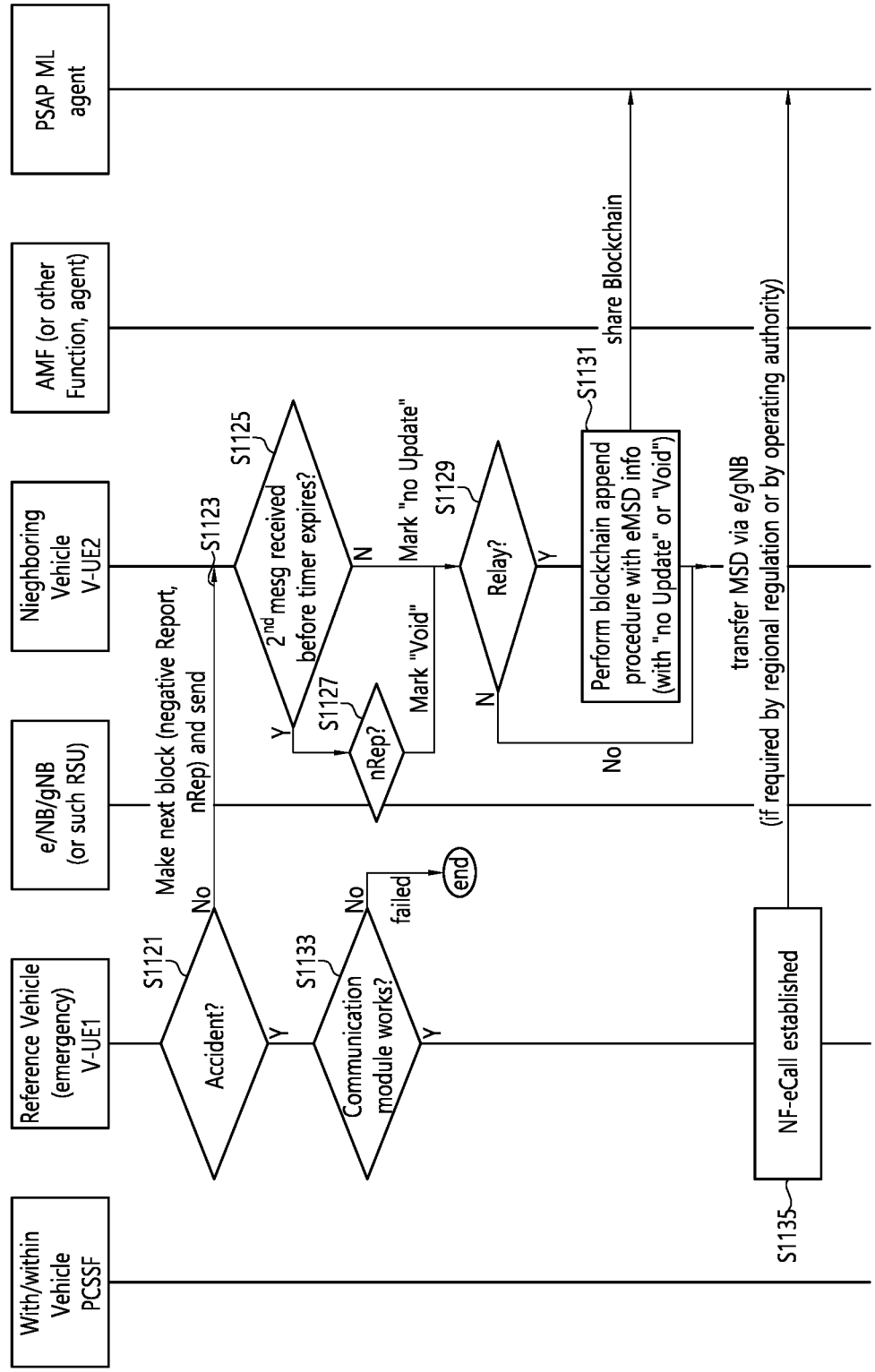

FIGS. 11A and 11B show a flow diagram of generating and relaying a behavior of blockchain between a reference V-UE and its neighboring V-UEs according to an embodiment of the present disclosure. The reference V-UE may be involved or likely to be involved with an accident.

Referring to FIG. 11A, in step S1101, AMF may prepare estimated density of V-UEs. The AMF may obtain density information of V-UEs in a geographical area.

In step S1103, the AMF may send the density information to eNB/gNB. The eNB/gNB may comprise a road side unit (RSU).

In step S1105 and S1107, the eNB/gNB may disseminate the received density information to V-UEs in a coverage area of the eNB/gNB. The eNB/gNB can broadcast/transmit the density information to share the density information with V-UEs in the coverage area. The eNB/gNB may include the density information in a SIB (e.g., SIB2).

In step S1109, each V-UE may prepare/determine relay/forward probability (i.e., probability of each V-UE relaying/forwarding information received by each V-UE) based on the density information.

In step S1111, PCSSF may transmit PCS sensing indication to V-UE1, which is a reference vehicle in emergency.

In step S1113, the V-UE1 may generate eMSD and/or make a genesis block.

In step S1115, the V-UE1 may disseminate the eMSD and/or block. Neighboring vehicle V-UE2 may receive the eMSD and/or block.

In step S1117, the V-UE2 may determine whether to relay the received eMSD and/or block or not based on the relay/forward probability. That is, neighboring V-UEs (e.g., V-UE2) of an emergency V-UE (e.g., V-UE1) that have received emergency-related information (e.g., eMSD and/or block) may not always relay/forward the received information to PSAP but, perform a random number based checking using a threshold value (criterion).

In step S1119, the V-UE2 may start a timer, to wait for next block.

Steps in FIG. 11A may continue to those in FIG. 11B.

Referring to FIG. 11B, in step S1121, the V-UE1 may determine whether an accident occurred.

In step S1123, if the accident did not occur, the V-UE1 may make a next block including negative report, and send the next block to the V-UE2. The negative report may indicate that the accident did not occur, and may be denoted as "nRep".

In step S1125, the V-UE2 may determine whether the next block is received before the timer expires.

In step S1127, if the next block is received before the timer expires, the V-UE2 may determine whether the next block includes nRep. If the next block includes nRep, the V-UE2 may mark "no update" or "void".

In step S1129, the V-UE2 may determine whether to relay a blockchain based on the relay/forward probability.

In step S1131, the V-UE2 may perform a blockchain append procedure with eMSD information (with "no update" or "void"). Then, the V-UE2 may share the block chain to PSAP.

In step S1133, if the accident occurred, the V-UE1 may determine whether a communication module works.

In step S1135, if the communication module works even after some accident has really happened, the V-UE1 may establish NG-eCall, and transfer the MSD to PSAP via eNB/gNB.

Hereinafter, it is proposed how to control the parameter of relaying/forwarding probability, which may be a threshold value (or, criterion) by which a neighboring V-UE will decide whether or not to relay the received emergency-related information to PSAP. The following list of parameters and/or notation are found in table 3:

TABLE 3

| Parameter | Definition/details |
|---|---|
| N | The number of neighboring vehicle UEs (V-UEs) of a reference V-UE |
| p | The probability that a neighboring V-UE will relay the received blockchain to eNB/gNB ($0 \leq p \leq 1$, $q = 1 - p$) |
| R | random variable (r.v.) denoting the number of relaying V-UEs for a reference V-UE |
| $f_k(p)$ | the probability mass function that $R = k$, or $f_k(p) \equiv \Pr(R = k)$ |

Without explicitly specifying about the openness or closeness of the interval of p, open interval of 0<p<1 may be used. For analytical handling of $f_k(p)$ (e.g., differentiation of the function), it may be assumed that the number of V-UEs is not greater than n. For example, there may be no such component of $(1-p)^{n-3}$ in the derivative of $f_2(p)$ for n=2 as there may be no such component of $(1-p)^{n-2}$ to carry forward with, to differentiate. Likewise, for n=3, there may be no such component of $(1-p)^{n-3}$ to carry forward with.

Assume that the relaying behavior, such as decision to relay, of the respective neighboring V-UEs are independent and identically distributed (i.e., i.i.d). For N=n, the number of relaying V-UEs for a reference V-UE, denoted by a random variable R, may follow a binomial distribution with p and n.

For example, the probability that none of n neighboring V-UEs will relay the emergency related information to PSAP may be expressed as $f_0(p)=(1-p)^n$.

$f_0(p)$ may be monotonous decreasing with respect to the probability of relaying p in interval (0, 1). Taking a larger value of p may be obviously the better solution to reduce the probability that no neighboring V-UEs are relaying the received blockchain with necessary preliminary proof-of-work task. However, this may be a root cause of unnecessary overflow of relayed messages of a single accident, which is the working point of the present disclosure to improve.

Similarly, a probability that 1 out of n neighboring V-UEs will relay emergency related information to PSAP may be expressed as $f_1(p)=np(1-p)^n$. $f_1(p)$ may be monotone increasing in p, in interval (0, 1/n) and is monotone decreasing in p, in interval (1/n, 1).

Proposition 1) Given that each of neighboring V-UEs performs a relaying function of the received blockchain, in an independently and identically distributed manner, the supremum of the probability that there is only one V-UE that performs the relaying may be greater than 1/e for any n (i.e., the number of neighboring V-UEs). That is, $$f_1(p^*) > \frac{1}{e}$$

where $p^*=\arg \sup_p \{f_1(p^*)\}$, or simply $$\underset{p}{\text{Supremum}}\, f_1(p) > \frac{1}{e}.$$

Proof: For 0<p<1, $$\frac{df_1}{dp} = n(1-p)^{n-2}(1-np)$$

and, for $p^*=1/n$, which is the solution of equation $$\frac{df_1}{dp} = 0$$

(for differentiation, open interval of (0, 1) is assumed). Then, $$f_1(p)|_{p=1/n} = \left(1 - \frac{1}{n}\right)^{n-1} = \left(1 - \frac{1}{n}\right)^n\left(\frac{n}{n-1}\right) > \frac{1}{e}\frac{n}{n-1} > \frac{1}{e}.$$

Therefore, $$\lim_{n \to \infty} f_1(p)|_{p=1/n} = \frac{1}{e}.$$

Proposition 2) The probability that the neighboring V-UEs responding out of n V-UEs (n>2), denoted by $f_2(p)$, may be given by $$f_2(p) = \frac{n(n-1)}{2}p^2(1-p)^{n-2}.$$

The derivative of $f_2(p)$ may be given by $$\frac{df_2}{dp} = p(1-p)^{n-2}(2-np)\frac{n(n-1)}{2}.$$

For 0<p<1, $f_2(p)$ may have a unique extreme point at $$p^* = \frac{2}{n}.$$

It can be simply verified that both $f_1(p)$ and $f_2(p)$ are concave in $$\left(\frac{1}{n} - \varepsilon, \frac{1}{n} + \varepsilon\right) \text{ and } \left(\frac{2}{n} - \varepsilon, \frac{2}{n} + \varepsilon\right)$$

for $\varepsilon>0$, respectively. Therefore, both $f_1(p)$ and $f_2(p)$ have supremum at the extreme point, respectively.

Consider a function $f_a(p)\equiv f_1(p)+f_2(p)$. Then, $$\frac{df_a}{dp} = n(1-p)^{n-2}(1-np) - p(1-p)^{n-3}(2-np)\frac{n(n-1)}{2} =$$

$$n(1-p)^{n-3}\left[(1-p)(1-np) + p(2-np)\frac{n-1}{2}\right].$$

This can be simplified to $$n(1-p)^{n-3}\left[-p^2\frac{n(n-3)}{2} - 2p + 1\right].$$

If $n(n-3)\neq 0$ (practically, if $n>3$), this yields a quadratic equation of $$p, \frac{n(n-3)}{2}p^2 + 2p - 1 = 0,$$

whose solution is the unique solution of $$\frac{df_a}{dp} = 0 \text{ for } 0 < p < 1.$$

The solution $p^*$ of the equation $$\frac{n(n-3)}{2}p^2 + 2p - 1 = 0 \text{ is } p^* = \frac{-2 + \sqrt{2n(n-3)+4}}{n(n-3)},$$

and $p^*$ belongs to the interval $$\left(\frac{1}{n}, \frac{2}{n}\right).$$

It can be easily verified that $$\frac{df_a}{dp}\left(\frac{1}{n}\right) > 0$$

for all $n>3$ and that $$\frac{df_a}{d_p}\left(\frac{2}{n}\right) < 0$$

for all $n>3$.

If n=2 or 3, the probability that t 째 neighboring V-UEs will relay the received blockchain, (i.e., $f_2(p)$), and the first order derivative can easily be handled without having to take a general form with respect to n.

For n>3, a probability $p^*$ that an arbitrary V-UE will generate a new block and send to PSAP (or relay to PSAP) can be approximated as $$p^* \approx \frac{23}{16n},$$

with the maximum error range of $$\frac{1}{16n},$$

where $$p^* = \frac{-2 + \sqrt{2n(n-3)+4}}{n(n-3)}.$$

This can be proved as the followings. Since the inequality $$7\left(n - \frac{5}{7}\right)^2 - \left(\frac{25}{7} + 33\right) > 0$$

holds for all n>3, $$p^* > \frac{11}{8n}$$

holds. Also, since the inequality $(n-3)^2>0$ holds for all n>3, $$p^* < \frac{12}{8n}$$

holds. Therefore, $$\frac{11}{8n} < p^* < \frac{12}{8n}$$

holds and the approximation $$p^* \approx \frac{23}{16n}$$

has the maximum error range of $$\frac{1}{2}\left(\frac{12}{8n} - \frac{11}{8n}\right) = \frac{1}{16n}$$

where $$p^* = \frac{-2 + \sqrt{2n(n-3)+4}}{n(n-3)}.$$

Proposition 3) For n=2, the probability that two neighboring V-UEs will relay the received blockchain (i.e., $f_2(p)$) is a monotone increasing function in p. There does not exist any extreme point of the function.

For n=3, the probability that two neighboring V-UEs will relay the received blockchain (i.e., $f_2(p)$) has a unique extreme point at $$p^* = \frac{1}{2}.$$

Figure 12:
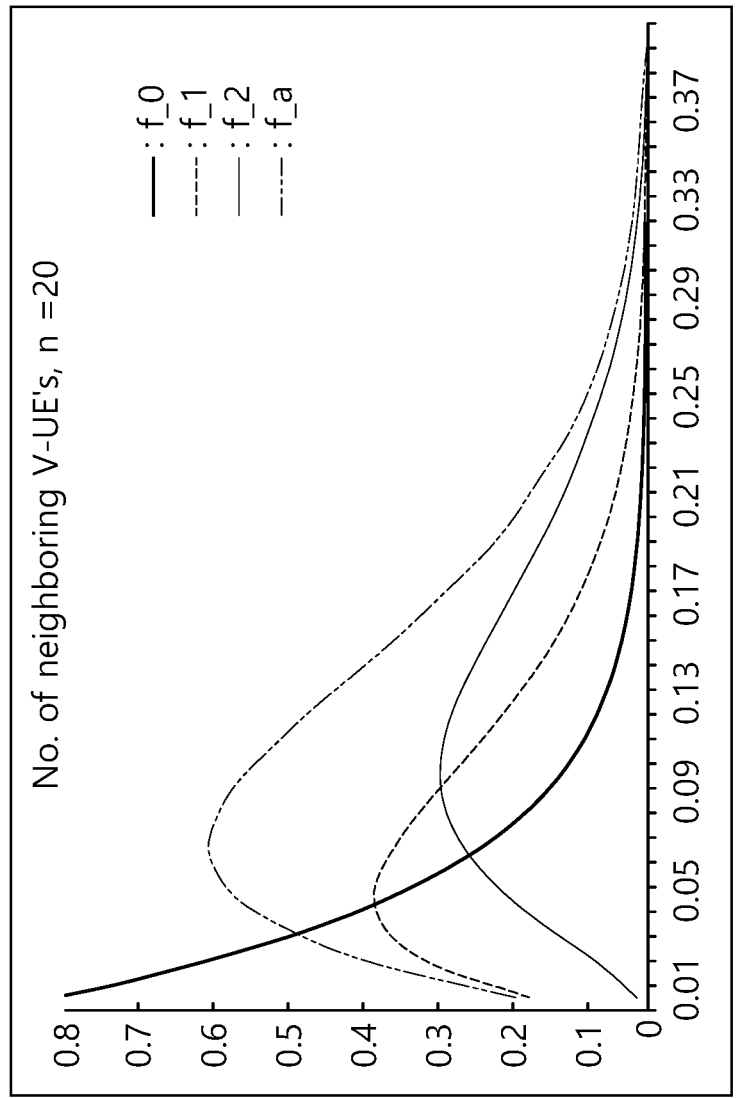
FIG. 12 shows the behavior of probability mass functions versus the probability of relaying p, when the number of neighboring V-UEs is 20 according to an embodiment of the present disclosure.

FIG. 12 shows the behavior of probability mass functions, $f_0(p)$, $f_1(p)$, $f_2(p)$ and $f_a(p)$, versus the probability of relaying p, when the number of neighboring V-UEs is 20 according to an embodiment of the present disclosure. The x-axis denotes a relaying probability p, and the y-axis denotes a value of $f_0(p)$, $f_1(p)$, $f_2(p)$ and $f_a(p)$ with respect to the relaying probability p when the number of neighboring V-UEs is 20, respectively.

Figure 13:
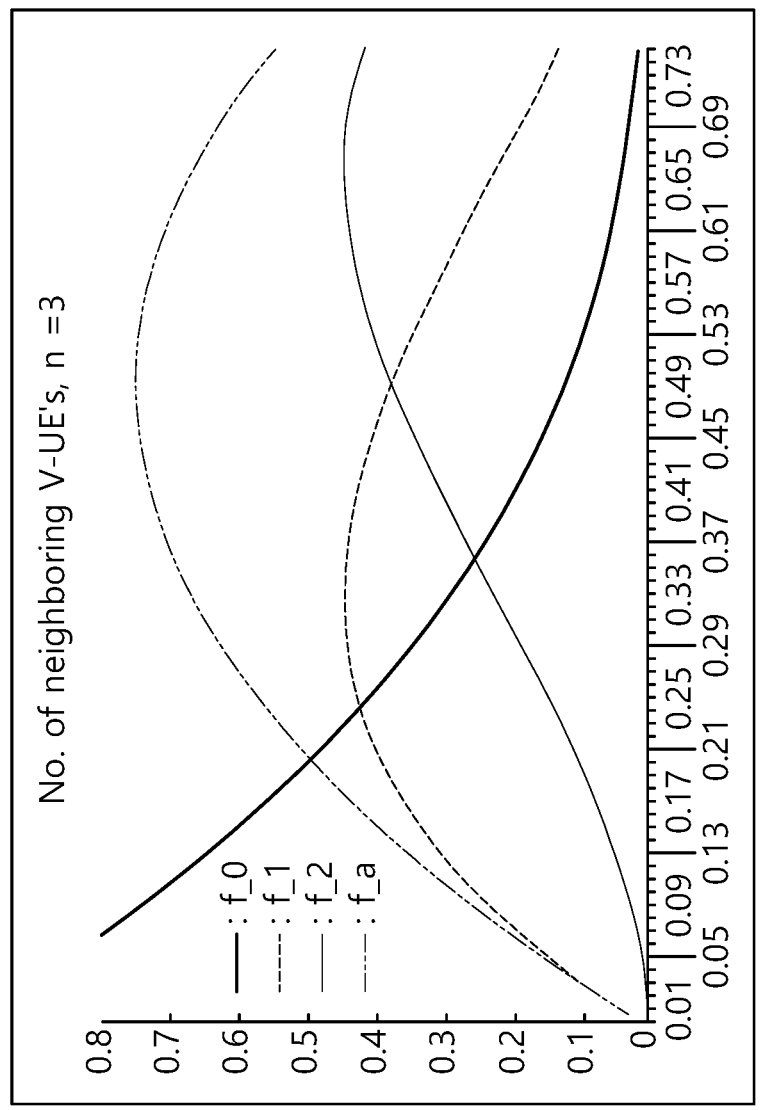
FIG. 13 shows the behavior of probability mass function versus the probability of relaying p, when the number of neighboring V-UEs is 3 according to an embodiment of the present disclosure.

FIG. 13 shows the behavior of probability mass function $f_0(p)$, $f_1(p)$, $f_2(p)$ and $f_a(p)$, versus the probability of relaying p, when the number of neighboring V-UEs is 3 according to an embodiment of the present disclosure. The x-axis denotes a relaying probability p, and the y-axis denotes a value of $f_0(p)$, $f_1(p)$, $f_2(p)$ and $f_a(p)$ with respect to the relaying probability p when hen the number of neighboring V-UEs is 3, respectively.

Hereinafter, how a UE should select a threshold value of the probability to relay the received blockchain (or message) is described.

If the prepared information (i.e., density information or the number of neighboring V-UEs) indicates or is considered an implication that there are not sufficiently many neighboring V-UEs (for example, on average, less than or equal to three; this quantity does not include the V-UE (or vehicle) that has sent out precursory information/indication of accident), then a V-UE shall perform the followings:

(a) if the estimated number of neighboring V-UEs is 2 or less, the V-UE may set the threshold value of relaying probability as 1 (or, 100%, all the emergency-related information it has received will be relayed to PSAP). That is, all neighboring V-UEs that have received the emergency-related information shall perform blockchain appending procedure and report the blockchain to PSAP.

(b) if the estimated number of neighboring V-UEs is 3, the V-UE may set the threshold value of relaying probability as 0.67 (or, 67%, or the closest value defined in the system. For example, if the neighboring values are 0.65 and 0.70 and if there is no value of 0.67 in the system, then 0.65 can be chosen instead). That is, on average two thirds of neighboring V-UEs that have received the emergency-related information shall perform blockchain appending procedure and report the blockchain to PSAP.

On the other hand, if the prepared information (i.e., density information or the number of neighboring V-UEs) indicates or is considered an implication that there are many neighboring V-UEs (for example, on average, more than three), then a V-UE shall pick up the value closes to $$p^* = \frac{23}{16n}$$

which is used in the system if the estimated number of neighboring V-UEs is n (>3).

Figure 14:
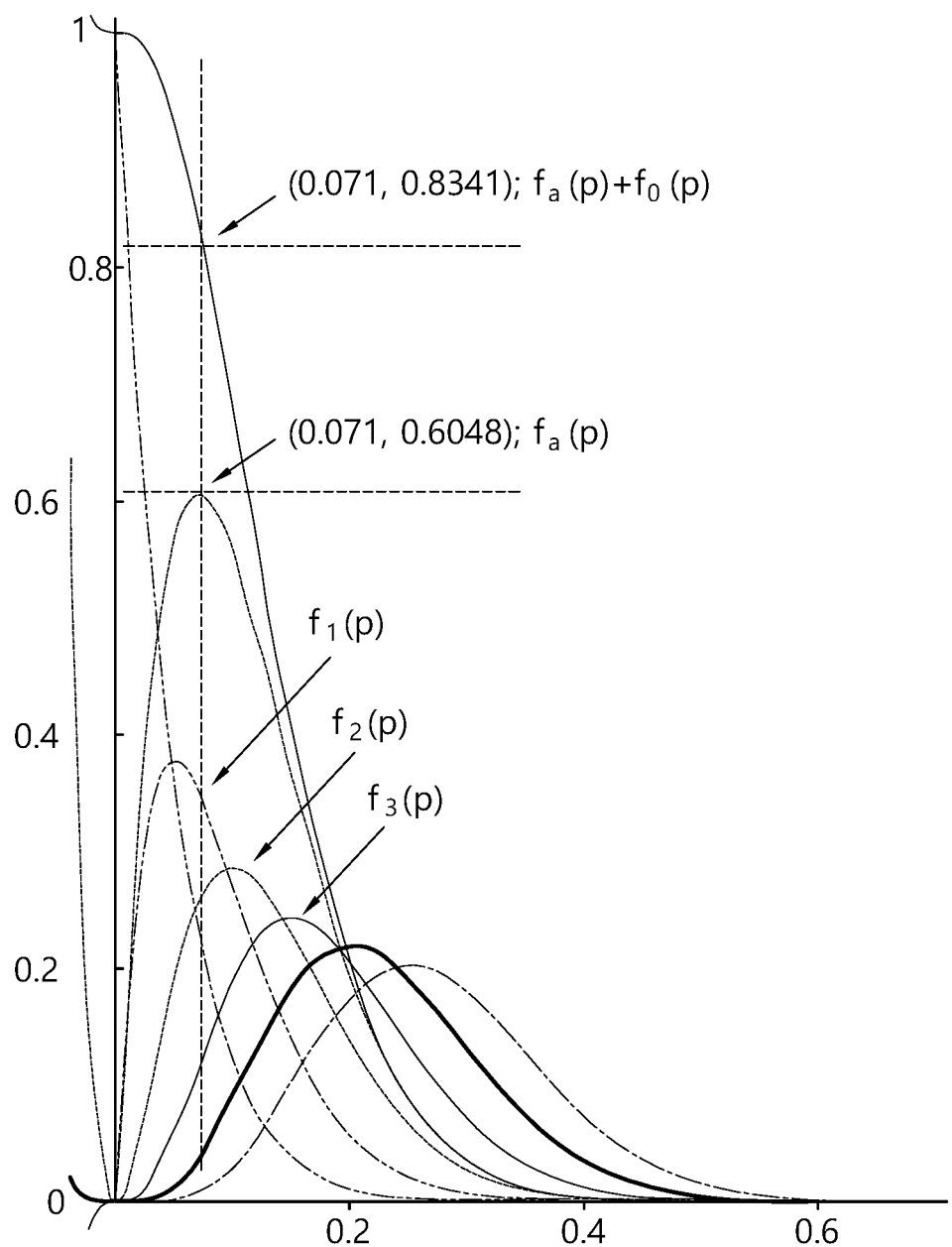
FIG. 14 shows the behavior of probability mass functions versus the probability of relaying p, for various number of relaying V-UEs according to an embodiment of the present disclosure.

FIG. 14 shows the behavior of probability mass functions $f_k(p)$, $f_a(p)$ and $f_a(p)+f_0(p)$ versus the probability of relaying p, for various number of relaying V-UEs according to an embodiment of the present disclosure. The x-axis denotes a relaying probability p, and the y-axis denotes a value of $f_k(p)$, $f_a(p)$ and $f_a(p)+f_0(p)$ with respect to the relaying probability p, respectively.

Hereinafter, an apparatus for a wireless device in a wireless communication system, according to some embodiments of the present disclosure, will be described.

For example, the wireless device may include at least one processor, a transceiver, and a memory.

For example, the at least one processor may be configured to be coupled operably with the memory and the transceiver.

The at least one processor may be configured to obtain density information of neighboring wireless devices with respect to a reference wireless device. The at least one processor may be configured to control the transceiver to receive a block from a neighboring wireless device. The at least one processor may be configured to determine a probability that the wireless device will relay the received block based on the density information. The at least one processor may be configured to determine whether to relay the received block based on the probability.

The density information may comprise at least one of the number of the neighboring wireless devices with respect to the reference wireless device, or a population density of the neighboring wireless devices in a geographical area related to the reference wireless device.

To obtain the density information, for example, the at least one processor may be configured to estimate the density information. For another example, the at least one processor may be configured to control the transceiver to receive the density information from a network. The density information may be received from the network via a SIB (e.g., SIB2).

The block may comprise emergency-related information for the reference vehicle in emergency. The emergency-related information may comprise at least one of a vehicle identity of the reference vehicle, location information of the reference vehicle, or a time stamp of the emergency. The emergency-related information may be a kind of eMSD.

The probability may comprise a threshold value. The at least one processor may be configured to randomly select an arbitrary value between 0 and 1 with equal probability. The at least one processor may be configured to determine whether to relay the received block based on a comparison between the arbitrary value and the threshold value.

The at least one processor may be configured to determine not to relay the received block based on that the arbitrary value is greater than the threshold value. The at least one processor may be configured to determine to relay the received block based on that the randomly selected arbitrary value is equal to or less than the threshold value. Then, the at least one processor may be configured to relay the received block to a network.

If/when the number of the neighboring wireless devices is 2 or less, the threshold value may be 1. If/when the number of the neighboring wireless devices is 3, the threshold value may be 0.67. If/when the number of the neighboring wireless devices is n which is greater than 3, the threshold value p* may be determined as $$p^* = \frac{23}{16n}.$$

Hereinafter, an apparatus for a BS in a wireless communication system, according to some embodiments of the present disclosure, will be described.

For example, the BS may include at least one processor, a transceiver, and a memory.

For example, the at least one processor may be configured to be coupled operably with the memory and the transceiver.

The at least one processor may be configured to control the transceiver to receive density information of neighboring wireless devices with respect a reference wireless device. The at least one processor may be configured to prepare SIB including the density information. The at least one processor may be configured to control the transceiver to transmit the SIB to a plurality of wireless device including a wireless device. The density information may be used to determine a probability that the wireless device will relay a block received by the wireless device.

Hereinafter, a processor for a wireless device in a wireless communication system, according to some embodiments of the present disclosure, will be described.

The processor may be configured to obtain density information of neighboring wireless devices with respect to a reference wireless device. The processor may be configured to receive a block. The processor may be configured to determine a probability that the wireless device will relay the received block based on the density information. The processor may be configured to determine whether to relay the received block based on the probability.

Hereinafter, a non-transitory computer-readable medium has stored thereon a plurality of instructions for a wireless device in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a base station.

The stored a plurality of instructions may cause the wireless device to: obtain density information of neighboring wireless devices with respect to a reference wireless device; receive a block; determine a probability that the wireless device will relay the received block based on the density information; and determine whether to relay the received block based on the probability.

The present disclosure may have various advantageous effects.

For example, a UE may selectively relay the emergency-related information to a network based on density information of neighboring vehicles around the emergency vehicle so that a load on communication channel and traffic congestion can be relieved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   obtaining density information of neighboring wireless devices with respect to a reference wireless device;
   receiving a block from a neighboring wireless device;
   determining a probability that the wireless device will relay the received block based on the density information; and
   determining whether to relay the received block based on the probability,
   wherein the block is related to a minimum set of data (MSD),
   wherein the MSD forms a data component of an emergency call (eCall),
   wherein the MSD comprises at least one of a vehicle identity, location information or time-stamp,
   wherein the MSD is specified to an enhanced MSD (eMSD),
   wherein the eMSD comprises vertical location coordinates, and
   wherein the eMSD is represented in a form of a blockchain.

2. The method of claim 1, wherein the density information comprises at least one of the number of the neighboring wireless devices with respect to the reference wireless device, or a population density of the neighboring wireless devices in a geographical area related to the reference wireless device.

3. The method of claim 1, wherein the obtaining of the density information comprises estimating the density information by the wireless device.

4. The method of claim 1, wherein the obtaining of the density information comprises receiving the density information from a network.

5. The method of claim 4, wherein the density information is received from the network via a system information block (SIB).

6. The method of claim 1, wherein the block comprises emergency-related information for the reference vehicle in emergency, and
wherein the emergency-related information comprises at least one of a vehicle identity of the reference vehicle, location information of the reference vehicle, or a time stamp of the emergency.

7. The method of claim 1, wherein the probability comprises a threshold value, and
wherein the determining of whether to relay the received block comprises:
randomly selecting an arbitrary value between 0 and 1 with equal probability; and
determining whether to relay the received block based on a comparison between the arbitrary value and the threshold value.

8. The method of claim 7, wherein the determining whether to relay the received block comprises determining not to relay the received block based on that the arbitrary value is greater than the threshold value.

9. The method of claim 7, wherein the determining of whether to relay the received block comprises:
determining to relay the received block based on that the randomly selected arbitrary value is equal to or less than the threshold value; and
relaying the received block to a network.

10. The method of claim 7, wherein the number of the neighboring wireless devices is 2 or less, and
wherein the threshold value is 1.

11. The method of claim 7, wherein the number of the neighboring wireless devices is 3, and
wherein the threshold value is 0.67.

12. The method of claim 7, wherein the number of the neighboring wireless devices is n which is greater than 3, and
wherein the threshold value p* is determined as:

$$p^* = \frac{23}{16n}.$$

13. The method of claim 1, wherein the wireless device is in communication with at least one of a user equipment, a network, or autonomous vehicles other than the wireless device.

14. A wireless device in a wireless communication system comprising:
a transceiver;
a memory; and
at least one processor operatively coupled with the transceiver and the memory, and configured to:
obtain density information of neighboring wireless devices with respect to a reference wireless device;
control the transceiver to receive a block;
determine a probability that the wireless device will relay the received block based on the density information; and
determine whether to relay the received block based on the probability,
wherein the block is related to a minimum set of data (MSD),
wherein the MSD forms a data component of an emergency call (eCall),
wherein the MSD comprises at least one of a vehicle identity, location information or time-stamp,
wherein the MSD is specified to an enhanced MSD (eMSD),
wherein the eMSD comprises vertical location coordinates, and
wherein the eMSD is represented in a form of a blockchain.

15. A computer-readable medium having recorded thereon a program for performing each step of a method on a computer, the method comprising:
obtaining density information of neighboring wireless devices with respect to a reference wireless device;
receiving a block;
determining a probability that the wireless device will relay the received block based on the density information; and
determining whether to relay the received block based on the probability,
wherein the block is related to a minimum set of data (MSD),
wherein the MSD forms a data component of an emergency call (eCall).
wherein the MSD comprises at least one of a vehicle identity, location information or time-stamp,
wherein the MSD is specified to an enhanced MSD (eMSD),
wherein the eMSD comprises vertical location coordinates, and
wherein the eMSD is represented in a form of a blockchain.

* * * * *